United States Patent

[11] 3,624,161

| [72] | Inventor | Robert A. Bub |
| | | 5316 Richland Road, Gibsonia, Pa. 15044 |
| [21] | Appl. No. | 703,916 |
| [22] | Filed | Feb. 8, 1968 |
| [45] | Patented | Nov. 30, 1971 |

[54] ZIGZAG FILTER ELEMENT AND METHOD OF MAKING IT
4 Claims, 6 Drawing Figs.

[52] U.S. Cl. .................................................. 55/521,
55/527, 83/46, 156/205, 156/256, 161/93, 161/133
[51] Int. Cl. ................................................... B01d 39/14
[50] Field of Search ........................................ 55/490,
495, 497–500, 501, 511, 514, 518, 521, 522, 524,
527, 528; 210/488, 491, 492, 493, 496, 498;
156/205, 207, 256, 211–254, 257, 227, 264;
161/93, 133; 83/32, 39, 46

[56] References Cited
UNITED STATES PATENTS

| 443,353 | 12/1890 | Bristol | 83/694 |
| 1,781,254 | 11/1930 | Stelzner | 55/511 |
| 2,137,246 | 11/1938 | Myers | 55/501 |
| 2,232,488 | 1/1941 | Smith | 156/257 |
| 2,539,768 | 1/1950 | Anderson | 210/496 |
| 2,826,265 | 3/1958 | Woody | 55/522 |
| 2,943,700 | 7/1960 | Bub | 55/500 |
| 3,043,731 | 7/1962 | Hill | 156/250 |
| 3,144,315 | 8/1964 | Hunn | 55/500 |
| 3,177,637 | 4/1965 | Davis | 55/497 |
| 3,212,242 | 10/1965 | Florine | 55/510 |
| 3,293,830 | 12/1966 | McKinlay | 55/498 |
| 3,327,865 | 6/1967 | Thompson | 210/504 |
| 3,352,423 | 11/1967 | Osterman | 210/496 |
| 3,386,227 | 6/1968 | Czerwonka | 55/521 |
| 3,392,846 | 7/1968 | Getzin | 55/497 |

FOREIGN PATENTS

| 365,463 | 1/1932 | Great Britain | 83/50 |
| 565,265 | 11/1944 | Great Britain | 55/497 |
| 401,287 | 10/1933 | Great Britain | 55/497 |

*Primary Examiner*—Frank W. Lutter
*Assistant Examiner*—Bernard Nozick
*Attorney*—Brown, Critchlow, Flick and Peckham ABSTRACT: A zigzag filter element is produced from innumerable fibers that had been laid upon one another to form a batt having upper and lower surfaces. The filter element has front and back faces and parallel slots cut nearly through it from those faces, with the slots at the front alternating with those at the back. The central longitudinal planes of the slots intersect opposed surfaces of the element corresponding to said upper and lower surfaces of the batt.

INVENTOR
ROBERT A. BUB

PATENTED NOV 30 1971 3,624,161
SHEET 2 OF 2
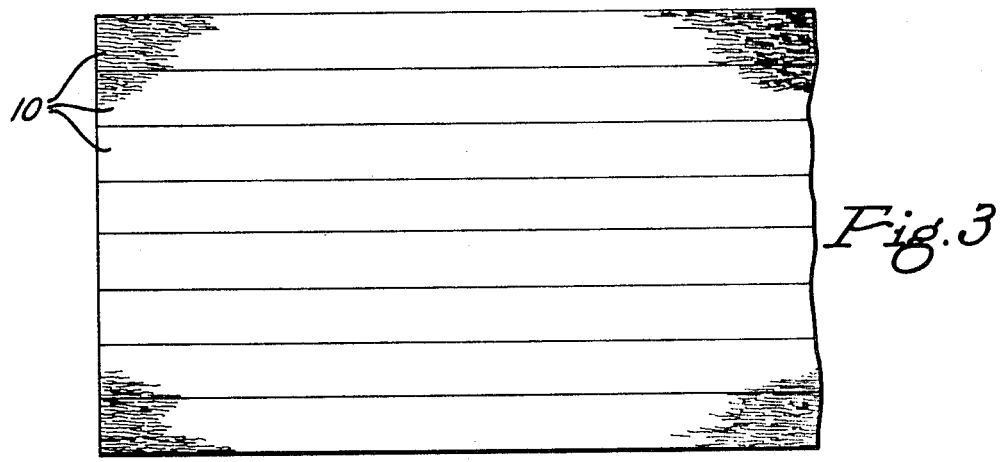
Fig.3
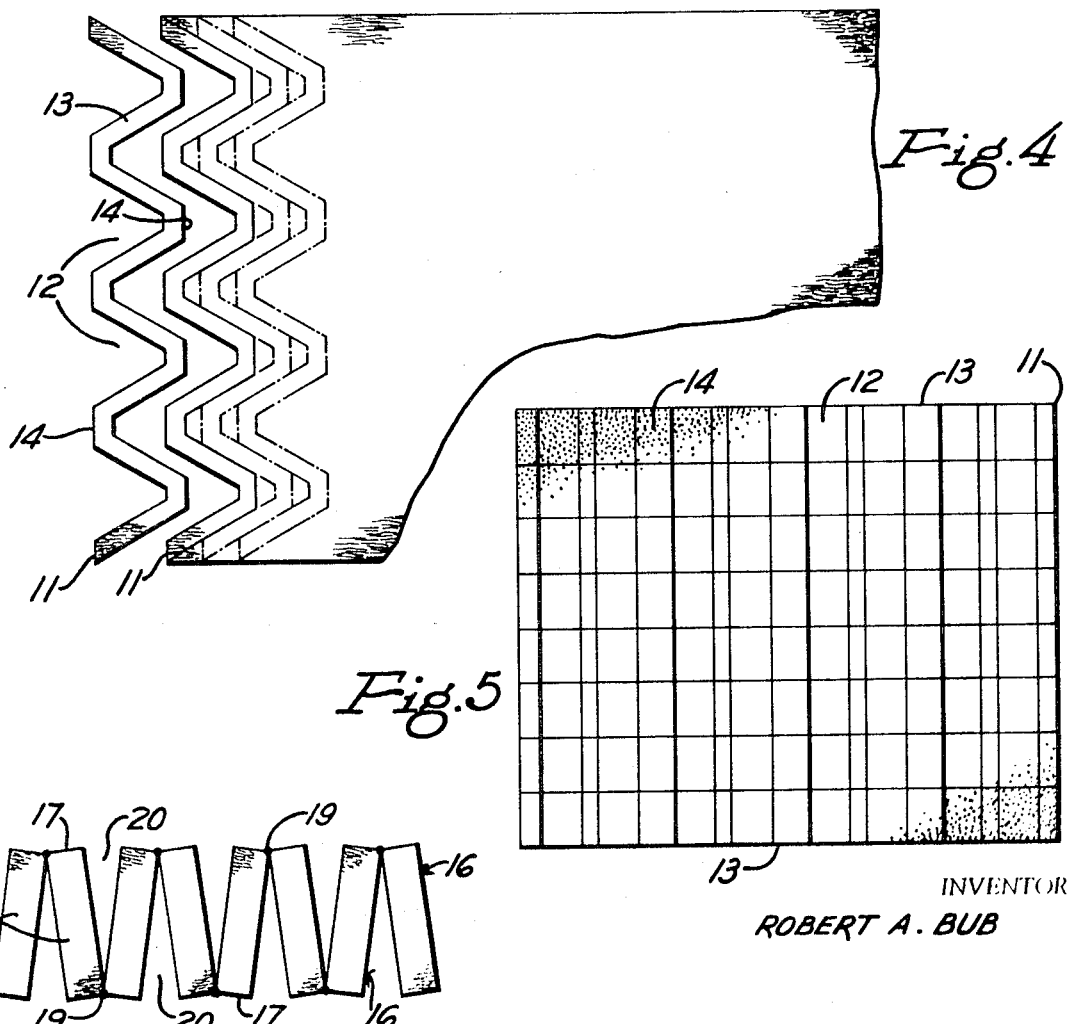
Fig.4
Fig.5
Fig.6
INVENTOR
ROBERT A. BUB
BY Brown, Critchlow, Flick & Peckham
ATTORNEYS.

ZIGZAG FILTER ELEMENT AND METHOD OF MAKING IT

Some filters are made from the mats of fibrous material formed by laying the fibers upon one another until the desired thickness has been obtained. The mats have upper and lower surfaces, between which the fibers extend more or less horizontally. The usual use of such a mat requires the air to flow through the mat from one of the surfaces just mentioned to the other surface. This tends to compress the mat and to load its front surface.

On the other hand, there are advantages in having most of the air flow through the filtering material substantially parallel to the upper and lower surfaces of the mat. This type of filtering is called edge filtering. One such filter on the market is provided with holes punched through the mat from its upper and lower surfaces, but at one surface alternate holes are covered while at the opposite surface the ends of the remaining holes are covered. Air enters the holes in one surface of the mat, flows laterally through the walls of the holes substantially parallel to that surface and into the holes that open at the other surface. An edge filter has the advantages of full depth loading and good structural strength. Also, the thickness of the filter is not compressed with air flow and loading, and its porosity can be controlled by compression or expansion or fiber distribution.

It is an object of this invention to provide an edge filter which can be made from a solid body with a minimum of work. Another object is to provide an improved method of making such a filter which can be performed rapidly and inexpensively, with little or no waste of material.

The preferred embodiment of the invention is illustrated in the accompanying drawings, in which FIG. 1 is an isometric view of a batt of fibrous material after it has been slit;

FIG. 3 is a side view of a modified batt;

FIG. 4 is a plan view thereof showing how filter elements are stamped from the modified batt;

FIG. 5 is a side view of one of the elements stamped from the batt of FIG. 3; and FIG. 6 is a side view of a further embodiment of the invention.

Figure 1:
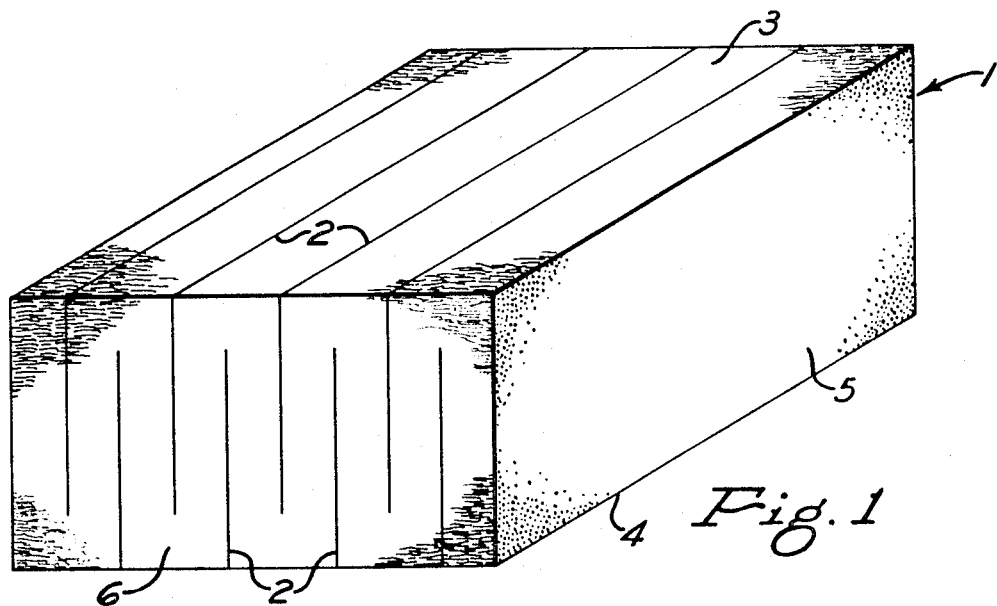

Referring to FIG. 1 of the drawings, a batt 1 of the desired size is formed from countless glass or asbestos fibers or the like by laying the fibers down on a desired area of suitable support and to the desired depth. In other words, the batt is built up by piling the substantially horizontal fibers on top of one another until the batt has reached the desired height. The batt will have substantially flat upper and lower surfaces, which are called the skin surfaces herein. A batt of the desired size then is slit to provide it with substantially parallel slots 2 extending nearly through it from two opposite surfaces. Lengthwise, the slots extend entirely across the batt. The slots at one side of the batt alternate with those at the other side. This slitting can be done by reciprocating or rotating knives. The slots extend inwardly from any sides of the batt except the two skin surfaces. The sides from which the slots extend inwardly are called the front and back faces 3 and 4, while the two sides parallel to the slots are called the ends 5.

Figure 2:
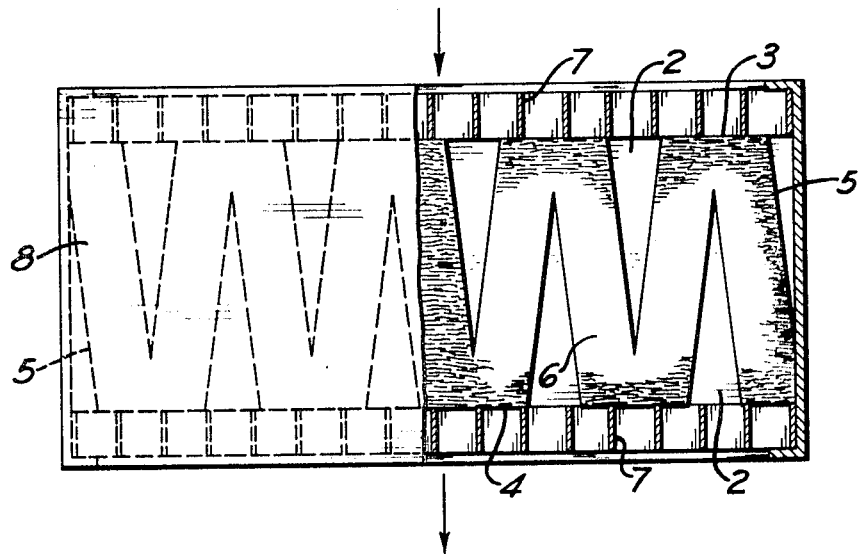
FIG. 2 is a side view of a complete filter with part of the side wall broken away.

An important feature of this invention is that the slitting is done in such a direction that the central longitudinal planes of the slots intersect the skin surfaces of the batt. They must not be parallel to those surfaces. Furthermore, the skin surfaces 6 are at the opposite ends of the slits, which is the location they must have if the full benefits of this invention are to be obtained. The slit batt then is expanded or stretched out lengthwise to cause the slots to become tapered or V-shape in cross section as shown in FIG. 2. To hold the element in its expanded form, grids 7 may be glued to its front and rear faces. Then this unit is mounted in a surrounding frame 8, with the sides and ends of the filter element sealed against the sides of the frame in the usual manner to prevent air from flowing around the element.

It will be seen that air entering the front of the filter will flow into the slots at that side and then laterally through the fibrous material forming the sidewalls of the slots and out into the slots that open to the rear of the filter. As it flows through the sidewalls of the slots, the air will travel generally parallel to the front and back faces 3 and 4 of the filter and also parallel to the skin surfaces 6; not perpendicular to those surfaces as has been the case heretofore. Even the air flowing into the front face 3 of the filter element will not travel perpendicular to a skin surface. Consequently, this filter provides full edge filtering, with all of the advantages arising therefrom.

Another way of making this filter, as shown in FIG. 3, is first to stack long mats 10 of fibrous material on top of one another to form a thick batt and glue them together sufficiently to prevent them from separating. These mats, like the batt first described, will be formed of fibers, most of which will lie in parallel horizontal planes. Zigzag filter elements 11 then are stamped in completed form from this long batt by starting at one end of the batt and cutting each element in turn from it, as shown in FIG. 4. The direction of cutting or stamping is from side to side of each filter element, lengthwise of the slots. That is, the V-shape slots 12 that are formed in the element will have their ends at the top and bottom of the batt. Consequently, as shown in FIG. 5, each zigzag filter element will consist of sections of the different mats disposed side by side and each extending from one end of the element to the other. The inner ends of the slots in the filter element may be flattened as shown in FIG. 4, or sharp. Also, the parallel central longitudinal planes of the slots in the filter element will intersect the sides 13 of the element and its front and rear faces 14, so that edge filtering will result when the element is put in use. The filter element may be mounted between grids in a frame, like the one in FIG. 2.

Instead of forming the filter element from a single unitary batt or a multilayer batt as described above, it can be made from a plurality of separate thin batts, each the same thickness as the wall of the filter element. This idea is illustrated in FIG. 6. The batts 16 may be produced individually or they may be sliced from a large batt, but their skin surfaces must be at its sides 18. The thin batts are placed side by side and adjoining batts are joined together, such as by an adhesive 19, along one edge. The joined edges are at the front and back faces of the filter element and are staggered so that the slots 20 thereby formed in the element open at opposite faces alternately as in the other embodiments of this invention.

I claim:

1. A zigzag filter element produced from innumerable fibers that were laid upon one another to form batt means of predetermined thickness having upper and lower skin surfaces, said element having front and back faces and being provided with a plurality of substantially parallel slots extending nearly through it from said faces and entirely across it, the slots at the front alternating with those at the back, and the opposed surfaces of the element corresponding to said skin surfaces of the batt being located at the opposite ends of the slots.

2. A zigzag filter element according to claim 1, formed from a plurality of separate thin batts disposed side by side and including means joining adjoining batts together at the inner ends of the slots.

3. A method of making a filter element from a body of fibrous material in which innumerable fibers were laid upon one another to form a batt of predetermined thickness having upper and lower skin surfaces, comprising cutting said body to form a zigzag filter element having ends and front and back faces and a plurality of substantially parallel slots extending nearly through the element from said faces and entirely across it, the slots at the front alternating with those at the back, the cutting of the slots being in a direction that locates their ends at the opposed surfaces of the element formed from said skin surfaces of the batt.

4. A method of making a zigzag filter element according to claim 3, including first securing a plurality of fibrous mats face to face to form said batt.

* * * * *